US012557038B2

(12) United States Patent
Sridharan et al.

(10) Patent No.: US 12,557,038 B2
(45) Date of Patent: Feb. 17, 2026

(54) POWER HEADROOM REPORTING FOR UNCONFIGURED CARRIERS WITH UNCONFIGURED UPLINK

(71) Applicant: QUALCOMM Incorporated, San Diego, CA (US)

(72) Inventors: Gokul Sridharan, Sunnyvale, CA (US); Peter Gaal, San Diego, CA (US); Kazuki Takeda, Minato-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 18/474,966

(22) Filed: Sep. 26, 2023

(65) Prior Publication Data

US 2024/0121726 A1   Apr. 11, 2024

Related U.S. Application Data

(60) Provisional application No. 63/412,272, filed on Sep. 30, 2022.

(51) Int. Cl.
*H04W 52/36* (2009.01)
*H04W 52/02* (2009.01)
*H04W 52/10* (2009.01)
*H04W 76/20* (2018.01)

(52) U.S. Cl.
CPC ..... *H04W 52/365* (2013.01); *H04W 52/0245* (2013.01); *H04W 52/10* (2013.01); *H04W 52/367* (2013.01); *H04W 76/20* (2018.02)

(58) Field of Classification Search
CPC .......... H04W 52/365; H04W 52/0245; H04W 52/10; H04W 52/367; H04W 76/20
See application file for complete search history.

(56) References Cited

U.S. PATENT DOCUMENTS

2014/0362780 A1   12/2014 Malladi et al.
2017/0310531 A1*  10/2017 Dinan ................. H04W 74/002
2017/0325172 A1*  11/2017 Dinan ................. H04W 52/367
(Continued)

FOREIGN PATENT DOCUMENTS

EP    3216279 A1   9/2017
EP    3413669 A1   12/2018

OTHER PUBLICATIONS

International Search Report and Written Opinion—PCT/US2023/075281—ISA/EPO—Feb. 5, 2024.

*Primary Examiner* — Ashley Shivers
(74) *Attorney, Agent, or Firm* — Loza & Loza, LLP

(57) ABSTRACT

Aspects relate to power headroom reporting for carriers unconfigured for uplink communication are described. In some aspects, a user equipment (UE) may transmit, to a network entity, a power headroom report (PHR) including first power headroom information for a configured carrier configured for uplink communication and second power headroom information for at least one unconfigured carrier that is unconfigured for uplink communication. The UE may further receive, from the network entity, a message indicating a selected carrier comprising one of the configured carrier and the at least one unconfigured carrier in response to the PHR, and may transmit, to the network entity, an uplink transmission via the selected carrier. Other aspects, embodiments, and features are also claimed and described.

30 Claims, 10 Drawing Sheets

(56) References Cited

U.S. PATENT DOCUMENTS

| | | | |
|---|---|---|---|
| 2018/0199353 A1* | 7/2018 | Ahn .................. | H04W 74/0808 |
| 2019/0045458 A1* | 2/2019 | Harada ................ | H04W 72/54 |
| 2019/0313348 A1* | 10/2019 | MolavianJazi ..... | H04W 52/281 |
| 2020/0205090 A1 | 6/2020 | Loehr et al. | |
| 2020/0336987 A1* | 10/2020 | Mukherjee .......... | H04W 52/367 |
| 2021/0045070 A1* | 2/2021 | Yi ..................... | H04W 72/0446 |
| 2021/0051606 A1* | 2/2021 | Yang ................... | H04W 80/02 |
| 2022/0078717 A1* | 3/2022 | Raghavan ........... | H04W 52/242 |

* cited by examiner

POWER HEADROOM REPORTING FOR UNCONFIGURED CARRIERS WITH UNCONFIGURED UPLINK

PRIORITY CLAIM

This application claims priority to and the benefit of provisional patent application No. 63/412,272 filed in the United States Patent & Trademark Office on Sep. 30, 2022, the entire content of which is incorporated herein by reference as if fully set forth below in its entirety and for all applicable purposes

TECHNICAL FIELD

The technology discussed below relates generally to wireless communication systems, and more particularly, to power headroom reporting.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, a UE may be configured to report power headroom information. The UE may transmit one or more power headroom reports to a network entity. The power headroom reports may indicate an amount of power available for uplink transmissions by the UE via a respective component carrier.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a user equipment (UE) is disclosed. The method includes transmitting, to a network entity, a power headroom report (PHR) including first power headroom information for a configured carrier configured for uplink communication and second power headroom information for at least one unconfigured carrier that is unconfigured for uplink communication. The method further includes receiving, from the network entity, a message indicating a selected carrier comprising one of the configured carrier and the at least one unconfigured carrier in response to the PHR, and transmitting, to the network entity, an uplink transmission via the selected carrier.

In another example, a UE for wireless communication is disclosed. The UE includes at least one processor, a transceiver communicatively coupled to the at least one processor, and a memory communicatively coupled to the at least one processor. The at least one processor may be configured to transmit, to a network entity, a PHR including first power headroom information for a configured carrier configured for uplink communication and second power headroom information for at least one unconfigured carrier that is unconfigured for uplink communication, receive, from the network entity, a message indicating a selected carrier comprising one of the configured carrier and the at least one unconfigured carrier in response to the PHR, and transmit, to the network entity, an uplink transmission via the selected carrier.

In another example, a non-transitory computer-readable storage medium having instructions for UE thereon may be disclosed. The instructions, when executed by a processing circuit, cause the processing circuit to transmit, to a network entity, a PHR including first power headroom information for a configured carrier configured for uplink communication and second power headroom information for at least one unconfigured carrier that is unconfigured for uplink communication, receive, from the network entity, a message indicating a selected carrier comprising one of the configured carrier and the at least one unconfigured carrier in response to the PHR, and transmit, to the network entity, an uplink transmission via the selected carrier.

In a further example, a UE for wireless communication may be disclosed. The UE includes means for transmitting, to a network entity, a PHR including first power headroom information for a configured carrier configured for uplink communication and second power headroom information for at least one unconfigured carrier that is unconfigured for uplink communication, means for receiving, from the network entity, a message indicating a selected carrier comprising one of the configured carrier and the at least one unconfigured carrier in response to the PHR, and means for transmitting, to the network entity, an uplink transmission via the selected carrier.

In one example, a method of wireless communication by a network entity is disclosed. The method includes receiving, from a UE, a PHR including first power headroom information for a configured carrier configured for uplink communication and second power headroom information for at least one unconfigured carrier that is unconfigured for uplink communication. The method includes selecting a carrier comprising one of the configured carrier and the at least one unconfigured carrier based on the PHR and transmitting, to the UE, a message indicating the selected carrier. The method further includes receiving, from the UE, an uplink transmission via the selected carrier.

In another example, a network entity for wireless communication is disclosed. The network entity includes at least one processor, a transceiver communicatively coupled to the at least one processor, and a memory communicatively coupled to the at least one processor. The at least one processor may be configured to: receive, from a UE, a PHR including first power headroom information for a configured carrier configured for uplink communication and second power headroom information for at least one unconfigured carrier that is unconfigured for uplink communication; select a carrier comprising one of the configured carrier and the at least one unconfigured carrier based on the PHR; transmit, to the UE, a message indicating the selected carrier; and receive, from the UE, an uplink transmission via the selected carrier.

In another example, a non-transitory computer-readable storage medium having instructions for a network entity station thereon may be disclosed. The instructions, when executed by a processing circuit, cause the processing circuit to: receive, from a UE, a PHR including first power headroom information for a configured carrier configured for uplink communication and second power headroom information for at least one unconfigured carrier that is unconfigured for uplink communication; select a carrier comprising one of the configured carrier and the at least one unconfigured carrier based on the PHR; transmit, to the UE, a message indicating the selected carrier; and receive, from the UE, an uplink transmission via the selected carrier In a further example, a network entity for wireless communication may be disclosed. The network entity includes means for receiving, from a UE, a PHR including first power headroom information for a configured carrier configured for uplink communication and second power headroom information for at least one unconfigured carrier that is unconfigured for uplink communication, means for selecting a carrier comprising one of the configured carrier and the at least one unconfigured carrier based on the PHR, means for transmitting, to the UE, a message indicating the selected carrier, and means for receiving, from the UE, an uplink transmission via the selected carrier.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio-frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
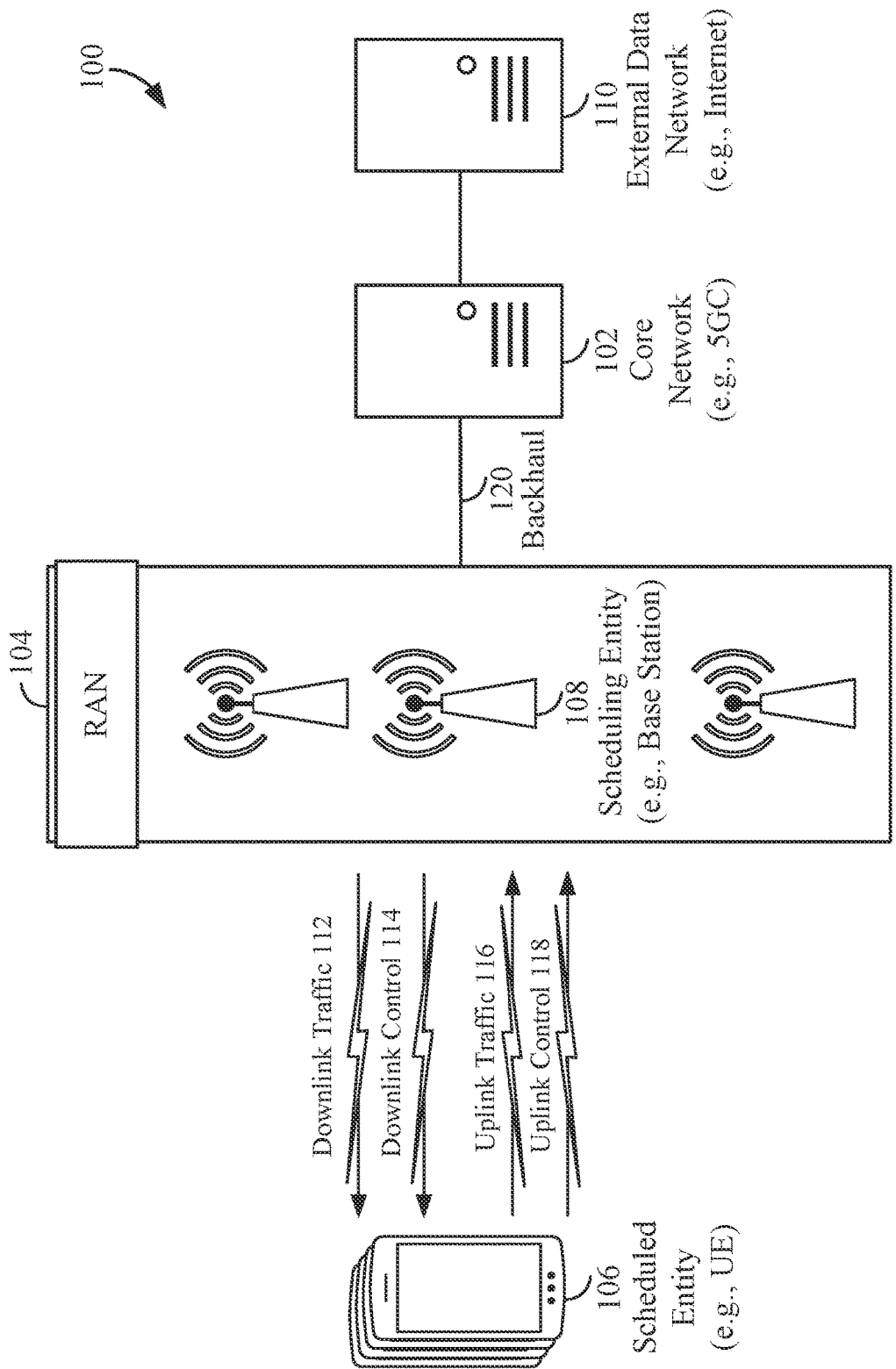
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of network entities 108, which may be base stations. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., network entity 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., network entity 108). Another way to describe this scheme may be to use the term broadcast channel multiplexing. Transmissions from a UE (e.g., UE 106) to a base station (e.g., network entity 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a network entity 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Network entities 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, network entities 108 may include a backhaul interface for communication with a backhaul portion 120 of the wireless communication system 100. The backhaul portion 120 may provide a link between a network entity 108 and the core network 102. Further, in some examples, a backhaul network may provide interconnection between the respective network entities 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
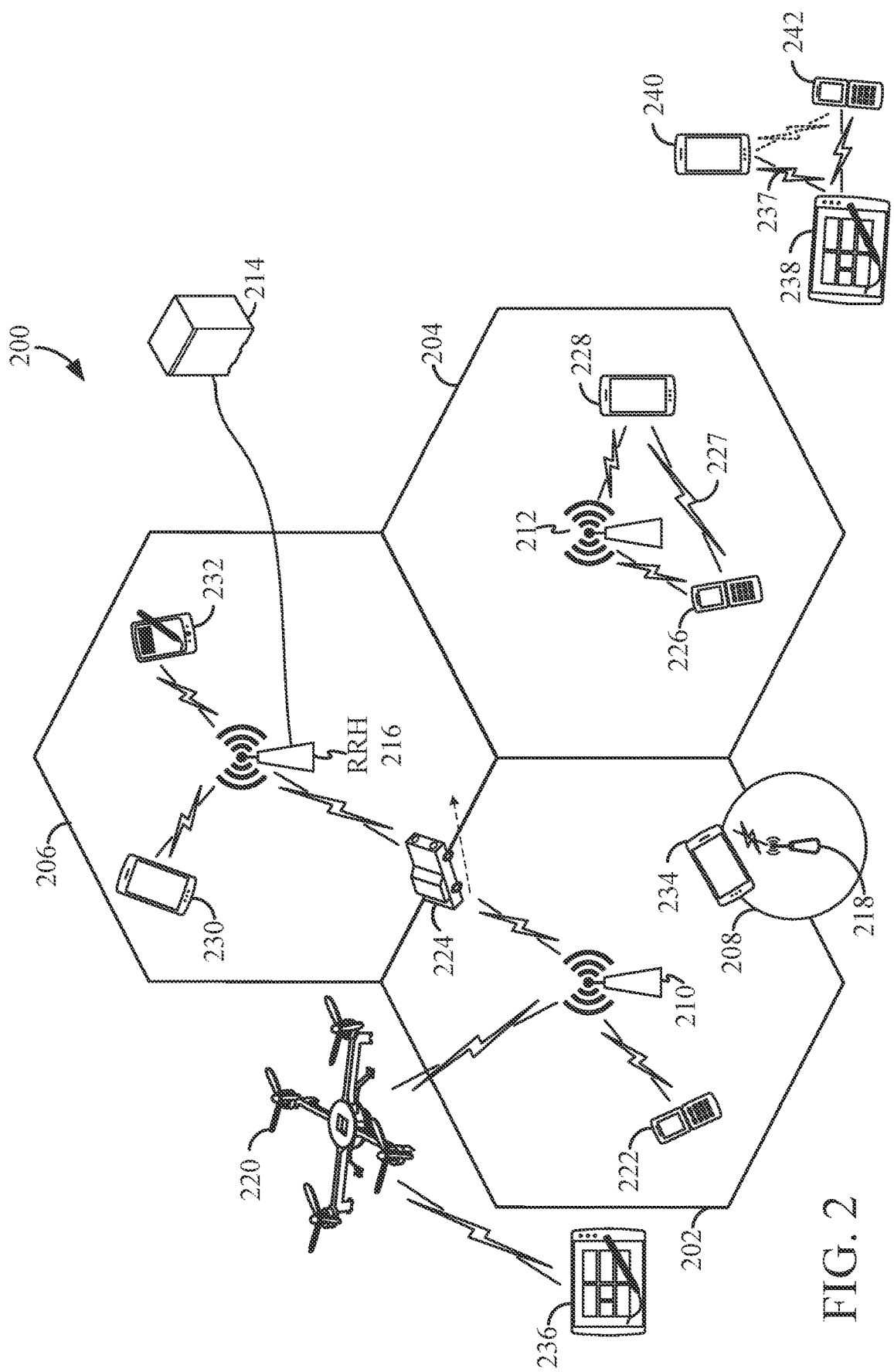
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
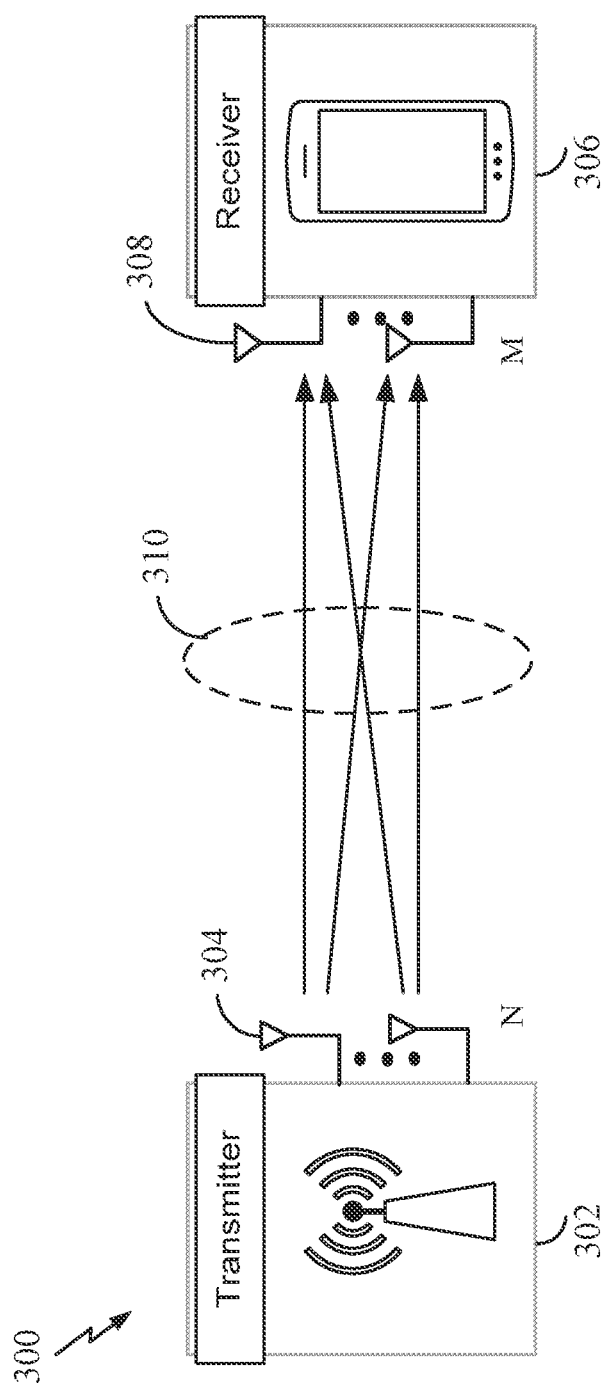
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the channel quality indicator (CQI) and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
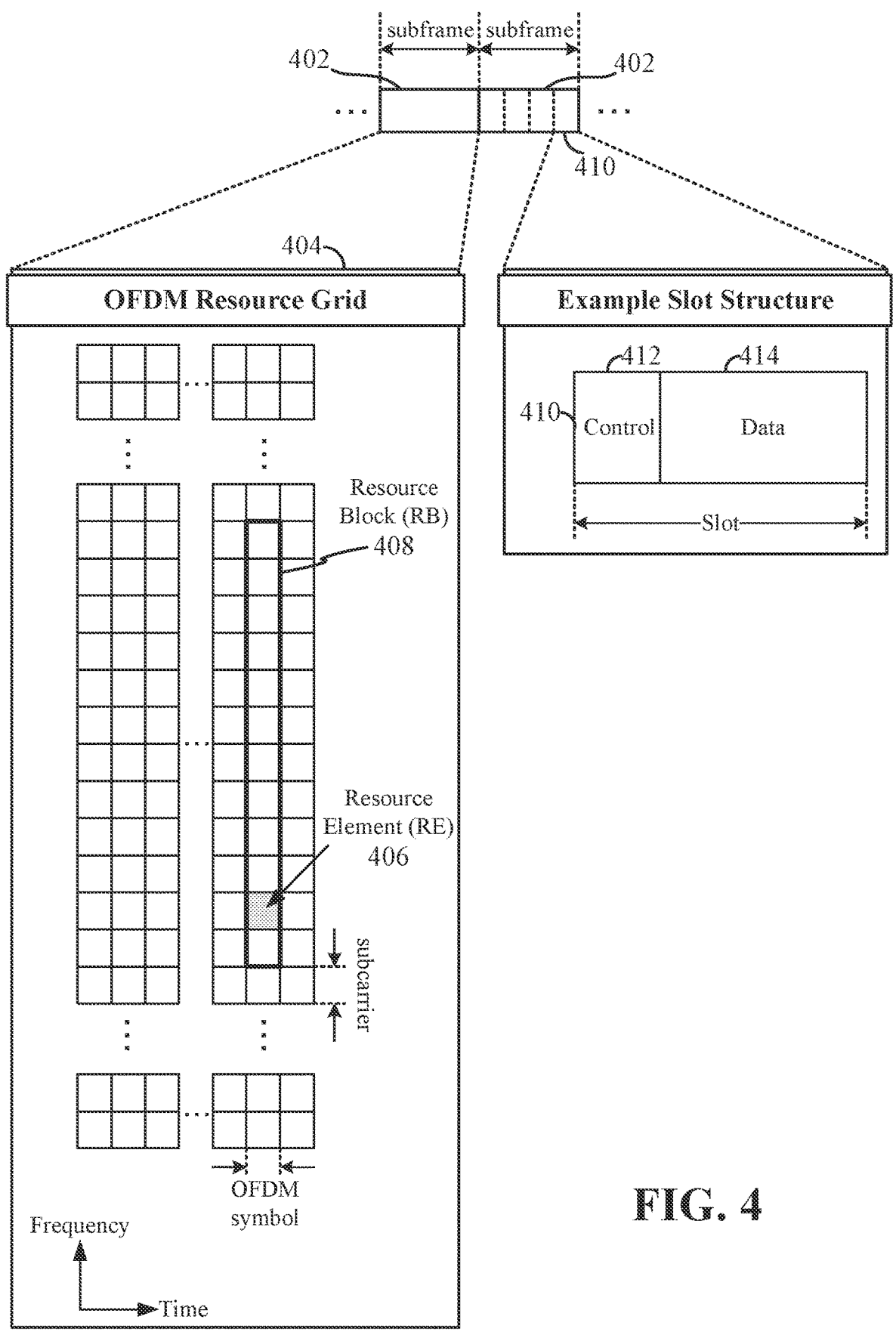
FIG. 4 is a schematic illustration of an organization of wireless resources in an air interface utilizing orthogonal frequency divisional multiplexing (OFDM) according to some aspects.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In some aspects, a UE 106 may be configured to report power headroom. The power headroom may indicate a remaining amount of transmission power available for the UE 106, in addition to the transmission power used by a current transmission. For example, a network entity 108 may transmit RRC signaling, or some other type of control signaling, that indicates a set of parameters for power headroom reporting. In some aspects, the power headroom reporting configuration may be indicated via an IE in the control signaling and configured across a group of one or more cells (e.g., indicated via a MAC-CellGroupConfig IE, or some other IE). The parameters for power headroom reporting that are indicated via the power headroom reporting configuration (e.g., phr-Config) may include one or more timers for power headroom reporting, a threshold change in power factor of a parameter for triggering a PHR report transmission (e.g., phr-Tx-PowerFactorChange), an indication of a format or a quantity of fields in a power headroom report (e.g., multiplePHR), a type of power headroom reporting (e.g., phr-Type2OtherCell), a mode of power headroom reporting (e.g., phr-ModeOtherCG), a configuration for maximum permissible exposure (MPE) reporting (e.g., mpe-Reporting-FR2-r16), one or more other parameters, or any combination thereof. The timers for power headroom reporting may include a periodic timer (e.g., phr-PeriodicTimer) that indicates a periodicity at which the UE 106 may transmit a power headroom report, a prohibit timer (e.g., phr-ProhibitTimer) that indicates a duration of time via which the UE 106 may refrain from transmitting a power headroom report, or both. The configuration for MPE reporting may indicate a timer (e.g., mpe-ProhibitTimer-r16), a threshold for MPE reporting, or both.

A UE 106 that receives the power headroom reporting configuration may transmit one or more power headroom reports to the network entity 108 in accordance with the parameters indicated via the power headroom reporting configuration. Each power headroom report may be transmitted via a media access control (MAC) control element (CE) (or MAC-CE), or some other uplink message. In some cases, a power headroom MAC-CE may include multiple fields for indicating power headroom parameters. A headroom field in the power headroom MAC-CE may include a first quantity of bits (e.g., six bits, or some other quantity of bits) for indicating a power headroom for a given component carrier. Table 1 includes example values of power headroom levels that may be indicated via the headroom field (e.g., a range of 64 power headroom levels) and Table 2 includes example mappings between the value reported via the power headroom MAC-CE and a measured value of power headroom in decibels (dBs), in some aspects.

TABLE 1

Power Headroom Levels For Power Headroom Reporting

| Power Headroom | Power Headroom Level |
| --- | --- |
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |

TABLE 1-continued

Power Headroom Levels For Power Headroom Reporting

| Power Headroom | Power Headroom Level |
|---|---|
| 62 | POWER_HEADROOM_62 |
| 63 | POWER_HEADROOM_63 |

TABLE 2

Power Headroom Report Mapping

| Reported value | Measured quantity value (dB) |
|---|---|
| POWER_HEADROOM_0 | PH < −32 |
| POWER_HEADROOM_1 | −32 ≤ PH < −31 |
| POWER_HEADROOM_2 | −31 ≤ PH < −30 |
| POWER_HEADROOM_3 | −30 ≤ PH < −29 |
| ... | ... |
| POWER_HEADROOM_53 | 20 ≤ PH < 21 |
| POWER_HEADROOM_54 | 21 ≤ PH < 22 |
| POWER_HEADROOM_55 | 22 ≤ PH < 24 |
| POWER_HEADROOM_56 | 24 ≤ PH < 26 |
| POWER_HEADROOM_57 | 26 ≤ PH < 28 |
| POWER_HEADROOM_58 | 28 ≤ PH < 30 |
| POWER_HEADROOM_59 | 30 ≤ PH < 32 |
| POWER_HEADROOM_60 | 32 ≤ PH < 34 |
| POWER_HEADROOM_61 | 34 ≤ PH < 36 |
| POWER_HEADROOM_62 | 36 ≤ PH < 38 |
| POWER_HEADROOM_63 | PH ≥ 38 |

A second field in the power headroom MAC-CE may include a quantity of bits (e.g., six bits, or some other quantity of bits) configured to indicate an amount of power available for transmissions by the UE 106 on a given component carrier and a given serving cell, which may be represented by the parameter $P_{CMAX,f,c}$, where f may correspond to (e.g., point to) the carrier and c may correspond to (e.g., point to) the serving cell. $P_{CMAX,f,c}$ may be relatively granular information. For example, $P_{CMAX,f,c}$ may, in some cases, be the most granular information the UE 106 can provide to a network entity 108 related to an amount of available transmission power at the UE 106 (e.g., one dB resolution). Table 3 includes example values of $P_{CMAX,f,c}$ that may be included in the second field in the power headroom MAC-CE and Table 4 includes example mappings between the value reported via the $P_{CMAX,f,c}$ field in the power headroom MAC-CE and a measured value of $P_{CMAX,f,c}$ in decibels per milliwatt (dBm), in some aspects.

TABLE 3

Nominal UE Transmit Power Level For Power Headroom Reporting

| $P_{CMAX,f,c}$ | Nominal UE Transmit Power Level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

TABLE 4

Mapping of $P_{CMAX,f,c}$

| Reported Value | Measured Quantity Value | Unit |
|---|---|---|
| PCMAX_C_00 | $P_{CMAX,f,c}$ < −29 | dBm |
| PCMAX_C_01 | −29 ≤ $P_{CMAX,f,c}$ < −28 | dBm |
| PCMAX_C_02 | −28 ≤ $P_{CMAX,f,c}$ < −27 | dBm |
| ... | ... | ... |
| PCMAX_C_61 | −31 ≤ $P_{CMAX,f,c}$ < −32 | dBm |
| PCMAX_C_62 | −32 ≤ $P_{CMAX,f,c}$ < −33 | dBm |
| PCMAX_C_63 | −33 ≤ $P_{CMAX,f,c}$ | dBm |

The UE 106 may set a value of $P_{CMAX,f,c}$ (e.g., a configured maximum output power for a given carrier, f, and serving cell, c) within the following bounds: $P_{CMAX\_L,f,c} \leq P_{CMAX,f,c} \leq P_{CMAX\_H,f,c}$, where $P_{CMAX\_L,f,c}$ and $P_{CMAX\_H,f,c}$ may be determined by the UE 106 based on one or more defined parameters. The parameters may include, for example, a maximum transmission power configured by a network entity 108 for the UE 106 (e.g., $P_{EMAX}$), a maximum transmission power configured by a network entity 108 for the UE 106 in a given serving cell, c (e.g., $P_{EMAX,c}$) a maximum power determined based on a power class of the UE 106 (e.g., $P_{PowerClass}$), a change or delta in the maximum power associated with the power class of the UE 106 (e.g., $\Delta P_{PowerClass}$), a maximum power reduction (MPR) parameter, one or more other parameters configured for the UE 106, or any combination thereof.

The UE 106 may determine a transmit power to use for transmitting an uplink transmission (e.g., a physical uplink shared channel (PUSCH) transmission) in an active uplink bandwidth part (BWP), b, of a component carrier, f, and a serving cell, c, based on the value of $P_{CMAX,f,c}$, and according to Equation 1 below.

$$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu M_{RB,b,f,c}^{PUSCH}(i)) + \\ \alpha_{b,f,c}(j)PL_{b,f,c}(q_d) + \Delta_{TF,b,f,c}(i) + f_{b,f,c}(i, l) \end{cases}$$

Equation (1)

In the example of Equation 1, j may correspond to a parameter set index, l may correspond to a PUSCH power control adjustment state index, and i may correspond to a transmission occasion index. Accordingly, the UE 106 may utilize the value of $P_{CMAX,f,c}$ to determine a maximum level of power the UE 106 may use to transmit an uplink transmission in a given transmission occasion.

The power headroom field in the power headroom report transmitted by the UE 106 may indicate a difference between the maximum power per carrier, $P_{CMAX,f,c}$, and the transmit power used by the UE 106 on a given carrier, $P_{PUSCH,b,f,c}(i, j, q_d, l)$. For example, the power headroom field may be based on Equation 2 for each component carrier.

$$PH(i,j,q_d,l) = P_{CMAX,f,c} - P_{PUSCH,b,f,c}(i,j,q_d,l)$$

Equation (2)

A P field in the MAC-CE may indicate whether MPE information is being reported by the UE 106. If the P field is set to one and MPE reporting is configured via the power headroom reporting configuration for the UE 106, the UE 106 may indicate, via an MPE field in the power headroom report, an applied power backoff (e.g., a power management MPR (P-MPR) level) to meet one or more MPE requirements for the UE 106. If the P field is not set to one, if the MPE reporting is not configured in the power headroom reporting configuration, if the UE 106 operates in a frequency band that does not support MPE reporting (e.g., Frequency Range 1 (FR1)), or any combination thereof, the MPE field may be a reserved field, which may be empty or null (e.g., R bits may be present). Table 5 includes example values of the MPE field in the power headroom MAC-CE.

TABLE 5

Effective Power Reduction For MPE P-MPR

| MPE | Nominal UE Transmit Power Level |
|---|---|
| 0 | P-MPR_00 |
| 1 | P-MPR_01 |
| 2 | P-MPR_02 |
| 3 | P-MPR_03 |

A MAC entity at the UE 106 may set the P field based on the P-MPR level applied to meet the MPE requirements. For example, if the applied P-MPR value is less than a threshold (e.g., P-MPR_00), the UE 106 may set the P field to zero. If the applied P-MPR value is greater than or the same as the threshold, the UE 106 may set the P field to one and report the P-MPR value via the MPE field. If MPE reporting is not configured in the power headroom reporting configuration or if the UE 106 operates in a frequency band that does not support MPE reporting (e.g., FR1), the P field may indicate whether power backoff is applied for power management. If the power backoff applied for power management affects a value of the $P_{CMAX,f,c}$ field, then the P field may be set to one. The P field may otherwise be set to zero.

The UE 106 may thereby receive the power headroom reporting configuration including one or more parameters for power headroom reporting, and the UE 106 may transmit one or more power headroom reports each including one or more bit fields to convey power headroom measurements or parameters, such as the examples illustrated in Tables 1-5. Each power headroom report may indicate headroom parameters for a respective component carrier. For example, the values of the bits in each of the P, power headroom, MPE, and $P_{CMAX,f,c}$ fields may be associated with communications on a single component carrier. In such cases, the UE 106 may transmit a power headroom report via each component carrier that is configured for communications at the UE 106.

Additionally, or alternatively, the UE 106 may generate and transmit a power headroom report that reports power headroom for more than two component carriers. For example, the combined power headroom report may include separate fields for reporting per-carrier power headroom information. An example combined power headroom report that includes a bitmap to indicate which component carriers power headroom is being reported for (using C1 to C7); an indication of whether a power backoff is being applied (using the P fields); an indication of whether the corresponding power headroom report is actual or virtual (using the V fields); reserved fields denoted by the R fields; and power headroom reports is shown in Table 6.

TABLE 6

Multiple Entry power headroom MAC-CE

| $C_7$ | $C_6$ | $C_5$ | $C_4$ | $C_3$ | $C_2$ | $C_1$ | R |
|---|---|---|---|---|---|---|---|
| P | V | \multicolumn{6}{l}{PH (Type 2, SpCell of the other MAC entity)} | | | | | |
| MPE or R | | | | $P_{CMAX,f,c}$ 1 | | | |
| P | V | | | PH (Type 1, PCell) | | | |
| MPE or R | | | | $PC_{MAX,f,c}$ 2 | | | |

TABLE 6-continued

Multiple Entry power headroom MAC-CE

| $C_7$ | $C_6$ | $C_5$ | $C_4$ | $C_3$ | $C_2$ | $C_1$ | R |
|---|---|---|---|---|---|---|---|
| P | V | | | PH (Type X, Serving Cell 1) | | | |
| MPE or R | | | | $P_{CMAX,f,c}$ 3 | | | |
| ... | ... | | | ... | | | |
| P | V | | | PH (Type X, Serving Cell n) | | | |
| MPE or R | | | | $P_{CMAX,f,c}$ m | | | |

In some systems, the UE 106 may report power headroom on a per-carrier basis, as described with reference to Tables 1-5 and Equation 2, and the UE 106 may not report the maximum output power across multiple component carriers. In such cases, the network entity 108 in communication with the UE 106 may not be aware of transmission power constraints at the UE 106. For example, a headroom (e.g., a remaining amount of power available for communications) to a maximum output power per carrier may be reported, but a headroom to a total maximum output power across multiple carriers may not be reported by the UE 106.

For a DL communication, a UE may be configured with a DL carrier aggregation (CA) across multiple carriers in different bands. On the other hand, for a UL communication, the UE is typically configured with a single carrier. For the DL communication using the DL CA, the UE monitors and makes measurements across different carriers to ensure DL reception stays robust. However, these measurements are not utilized for a UL communication in at least some of these carriers because the UE is generally not configured to use a carrier aggregation across these carriers for the UL communication.

The UE may at times determine that scheduling a UL transmission in a carrier different from a configured carrier that is configured for UL may be better for the network than utilizing the configured carrier for the UL transmission. The UE's knowledge of regulatory constraints on RF exposure may play a role in determining the amount of power the UE is able to deliver on a particular carrier. The amount of power the UE is able to deliver on a particular carrier may vary over time and across different carriers, e.g., based on how much RF exposure has occurred. Rather than having a network entity select a carrier for UL based solely on pathloss information, it may be beneficial to have a UE also report an amount of power available in each carrier, such that the network entity may consider both the pathloss information and the amount of power available in each carrier to determine which of the carriers is most suitable for UL. Hence, it may be advantageous to provide additional signaling that allows the network entity become aware of the power available in an unconfigured carrier for UL through power headroom reporting and/or through energy headroom reporting.

According to some aspects of the disclosure, a UE (e.g., UE 106) may transmit power headroom report (PHR) including first power headroom information on a configured carrier configured for UL and second power headroom information on at least one unconfigured carrier that is unconfigured for UL, such that a network entity (e.g., network entity 108) may receive the PHR and select one of the configured carrier and the at least one unconfigured carrier based on the PHR. For example, the network entity may select a carrier whose power headroom information indicates the most UE transmit power available for UL, out of the configured carrier and the at least one unconfigured carrier. In an aspect, an unconfigured carrier may be a carrier that either does not have an active uplink BWP or is not provided with an uplink configuration or a PUSCH configuration. Upon selecting a carrier based on the PHR, the network entity may transmit to the UE a message indicating the selected carrier. In an aspect, the message indicating the selected carrier may be transmitted via an RRC configuration message. When the UE receives the message indicating the selected carrier, the UE may transmit a UL communication using the selected carrier. In an aspect, the selected carrier may be the configured carrier or one of the at least one unconfigured carrier.

In an aspect, the first power headroom information on the configured carrier may be based on an actual PUSCH transmission taken place on the configured carrier. On the other hand, in an aspect, the second power headroom information on the at least one unconfigured carrier may be based on a reference PUSCH transmission on each of the at least one unconfigured carrier. Because no actual UL or PUSCH transmissions occur on an unconfigured carrier, a reference (or virtual) PUSCH transmission may be assumed for the at least one unconfigured carrier to determine the second power headroom information for the at least one unconfigured carrier for the PHR. For example, use of the reference PUSCH transmission may involve estimating how the power may be used if an actual PUSCH transmission had occurred on an unconfigured carrier.

Figure 5:
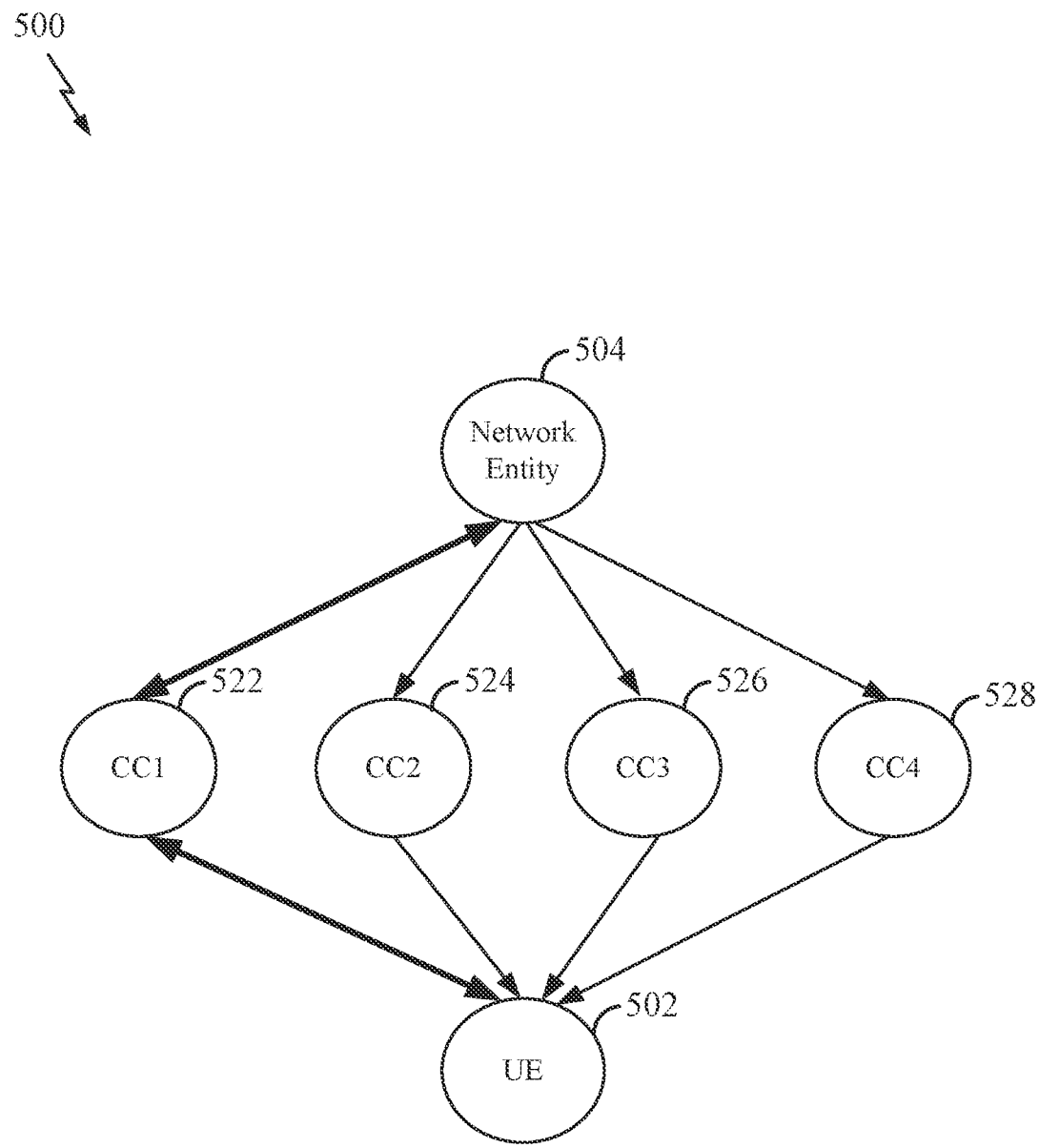
FIG. 5 is an example diagram illustrating communications between a user equipment (UE) and a network entity using various carriers, according to some aspects.

FIG. 5 is an example diagram illustrating communications between a user equipment (UE) and a network entity using various carriers, according to some aspects. As shown in FIG. 5, a UE 502 and a network entity 504 may communicate with each other using one or more of the carriers including a first carrier 522, a second carrier 524, a third carrier 526, and a fourth carrier 528. In some aspects, the UE 502 may be the UE 106 of FIG. 1 and the network entity 504 may be the network entity 108 of FIG. 1.

For a DL communication, DL carrier aggregation across the first carrier 522, the second carrier 524, the third carrier 526, and the fourth carrier 528 may be configured. On the other hand, for a UL communication, only a single carrier, such as the first carrier 522, may be configured. For the first carrier 522 that is configured for UL, the UE 502 transmits a PUSCH on the first carrier 522 at a particular power level and thus may determine first power headroom information for a PHR to indicate how much additional power is available at the UE. However, because no actual UL transmissions occur on the second carrier 524, the third carrier 526, and the fourth carrier 528 that are unconfigured for UL, no PUSCH is transmitted on these three unconfigured carriers. Therefore, a reference (or virtual) PUSCH transmission may be assumed for the second carrier 524, the third carrier 526, and the fourth carrier 528 to determine second power headroom information for these three unconfigured carriers for the PHR.

When the network entity 504 receives the PHR from the UE 502, the network entity may select a carrier including one of the first carrier 522, the second carrier 524, the third carrier 526, and the fourth carrier 528 based on the PHR, and transmit a message indicating the selected carrier. When the UE 502 receives the message indicating the selected carrier, the UE 502 may utilize the selected carrier for a UL transmission. For example, if the network entity 504 selects the second carrier 524 after considering the power headroom information for the four carriers based on the PHR, the network entity 504 may transmit the message indicating the second carrier 524 to the UE 502, and the UE 502 will utilize the second carrier 524 for a UL transmission based on the message.

In an aspect, the UE may transmit the PHR periodically based on a particular periodicity. In this aspect, the periodicity may be based on a periodicity of a carrier different from the configured carrier. For example, the periodicity may match the periodicity of the carrier different from the configured carrier. For example, referring to FIG. 5, the periodicity for transmitting the PHR may match a periodicity of one of the second carrier 524, the third carrier 526, and the fourth carrier 528 that are different from the first carrier 522 configured for UL. In an aspect, the network entity may transmit a PHR configuration (e.g., phr-Config) indicating the periodicity to the UE, where the PHR configuration maybe provided via an RRC message.

In an aspect, the UE may transmit the PHR upon receiving a PHR request from the network entity. In an example, the network entity may transmit the PHR request to the UE via a MAC-CE or DCI. In this aspect, the network entity may transmit the PHR request in response to a signal strength at the network entity being below a network entity signal strength threshold and/or in response to a load parameter on the configured carrier exceeding a carrier load threshold. In some examples, if radio conditions for the configured carrier to support UL deteriorate (e.g., the signal strength at the network entity falling below the network entity signal strength threshold), the network may try to find a better carrier to support a UL communication by transmitting the PHR request to the UE. In some examples, if the network entity determines that the configured carrier is overloaded (e.g., the load parameter on the configured carrier exceeding the carrier load threshold), the network may try to find another carrier that can better support a UL communication by transmitting the PHR request to the UE.

In an aspect, the UE may transmit the PHR in response to a triggering event. Examples of the triggering event are described below.

In an aspect, the triggering event may be a pathloss of the configured carrier exceeding a pathloss threshold. In an example where the pathloss threshold is 100 dB, the pathloss of the configured carrier exceeding 100 dB may indicate that the network entity is too strained to perform UL.

In an aspect, the triggering event may be a signal strength of the configured carrier falling below a UE signal strength threshold. In an example, the signal strength may be represented by a reference signal received power (RSRP). Hence, if the configured carrier becomes weaker or undesirable, the UE may let the network entity know about this condition by transmitting the PHR.

In an aspect, the triggering event may be an available power (or energy) in one of the at least one unconfigured carrier exceeding an available power threshold. In an example, the available power threshold may be an absolute threshold or a relative threshold relative to an available power in the configured carrier. In an example where the absolute threshold is utilized, if the available power in an unconfigured carrier exceeds the available power threshold, the triggering event occurs. In an example where the relative threshold is utilized, if an available power in an unconfigured carrier is greater than the available power in the configured carrier by at least the relative threshold, then the triggering event occurs. For example, assuming that the relative threshold is 3 dBm, if the available power that the UE is able to deliver on the configured carrier is 18 dBm and the available power on an unconfigured carrier is 23 dBm, the triggering event occurs because the available power in the unconfigured carrier is greater than the available power in the configured carrier by at least the relative threshold of 3 dBm. On the other hand, in this example, if the available power that the UE is able to deliver on the configured carrier is 18 dBm and the available power on an unconfigured carrier is 19 dBm, the triggering event does not occur because the available power in the unconfigured carrier is not greater than the available power in the configured carrier by at least the relative threshold of 3 dBm.

In an aspect, the triggering event may be a P-MPR backoff for one of the at least one unconfigured carrier being lower than a backoff threshold. In an example where the backoff threshold is 3 dB, if the UE is capable transmitting at 20 DB on an unconfigured carrier but is set to transmit at 18 dB, the P-MPR backoff is 2 DB, which is lower than the backoff threshold, and thus the triggering event occurs.

In an aspect, the first power headroom information may include one or more of a first maximum UE output power, a first power management maximum power reduction value (or first P-MPR), and a first power headroom value for the configured carrier. In an aspect, the second power headroom information may include one or more of a second maximum UE output power, a second power management maximum power reduction value (or second P-MPR), and a second power headroom value for each of the at least one unconfigured carrier, respectively. A maximum UE output power may be referred to as $P_{CMAX}$.

In an aspect, the second power headroom value may be based on the second maximum UE output power, the second power management maximum power reduction value, an open-loop transmit power based on an open-loop power control, and a pathloss. In this aspect, the open-loop transmit power is based on an open-loop nominal power parameter that is set to a predefined default value and an open-loop UE power parameter that is set to zero for the at least one unconfigured carrier. The open-loop transmit power for a PUSCH transmission may be referred to as $P_{O\_PUSCH}$.

In some aspects, the power headroom (PH) value for an unconfigured carrier may be calculated according to Equation 3 below, for a PUSCH transmission occasion i, with an active UL BWP b of carrier f of a serving cell c. As discussed above, the PH value for the unconfigured carrier may be determined based on a reference PUSCH transmission.

$$PH_{type1,b,f,c}(i,j,q_d,l) = \tilde{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\}$$ Equation (3)

In an aspect, $P_{CMAX,b,f,c}$ may represent a maximum configured power determined by a UE after taking a P-MPR backoff and other back offs into consideration. $P_{CMAX,b,f,c}$ may be computed assuming that an MPR is 0 dB, an A-MPR is 0 dB, while the P-MPR may be allowed to be a non-zero number. If the P-MPR is a non-zero number, the P-MPR is reported to the network entity by the UE. In some aspects, $\Delta T_c$ may be set to 0 dB.

In an aspect, $P_{O_{PUSCH,b,f,c}}$ or an open-loop transmit power for a PUSCH transmission, may represent a transmit power for a PUSCH transmission computed by an open loop power control. $P_{O_{PUSCH,b,f,c}}$ may include $P_{O\_NOMINAL\_PUSCH}$ and $P_{O\_UE\_PUSCH}$. $P_{O\_NOMINAL\_PUSCH} + P_{O\_UE\_PUSCH}$ may be determined based on one or more parameters including preambleReceivedTargetPower, msg3-DeltaPreamble, Configured GrantConfig, p0-NominalWithoutGrant, p0-PUSCH-Alpha, p0-PUSCH-AlphaSet, SRI-PUSCHPowerContro, and SRS resource indicator (SRI) field in DCI format 0_0/0_1. In an aspect, $P_{O\_NOMINAL\_PUSCH}$ may be dependent on other configured parameters that are unlikely to be available for an unconfigured carrier, while these configured parameters are generally available for a configured carrier. Hence, $P_{O\_NOMINAL\_PUSCH}$ may be set to a default value in case these configured parameters are not available to the UE. In an aspect, $P_{O\_UE\_PUSCH}$ may be governed by p0-PUSCH-Alpha and associated parameters. In this aspect, $P_{O\_UE\_PUSCH}$ may be set to zero for an unconfigured carrier.

In an aspect, $\alpha_{b,f,c}$ may represent a parameter governing a fractional pathloss compensation. $\alpha_{b,f,c}$ may control an amount of pathloss to compensate for. $\alpha_{b,f,c}$ may be set to zero for a configured carrier. For example, $\alpha_{b,f,c}$ may be set to p0-PUSCH-AlphaSetId, which is zero for a configured carrier. On the other hand, $\alpha_{b,f,c}$ may be set to 1 for an unconfigured carrier.

In an aspect, $PL_{b,f,c}$ may represent a pathloss, which may be determined by the UE via downlink measurements. $PL_{b,f,c}$ may be computed using pusch-PathlossReferenceRS-Id, which is zero, for a configured carrier. For an unconfigured carrier, an SSB (default SSB) may be used to compute $PL_{b,f,c}$.

In an aspect, $f_{b,f,c}$ may represent an accumulated transmit power control (TPC) command. $f_{b,f,c}$ may be set to 0 for an unconfigured carrier.

In some aspects, the UE may transmit the PHR using a multiple entry PHR MAC-CE. For example, the multiple entry PHR MAC-CE may be used to report both the first power headroom information for the configured carrier and the second power headroom information for the at least one unconfigured carrier. An example of the multiple entry PHR MAC-CE is shown in Table 6 above.

When a PUSCH pathloss reference is not given, the UE may utilize an SSB from which an MIB was obtained as a reference. In some aspects, when the field for a PUCCH power control (e.g, PUCCH-powerControl information element) is not configured, the UE may utilize the SSB as the reference signal, for reporting the PHR for an unconfigured carrier.

Figure 6:
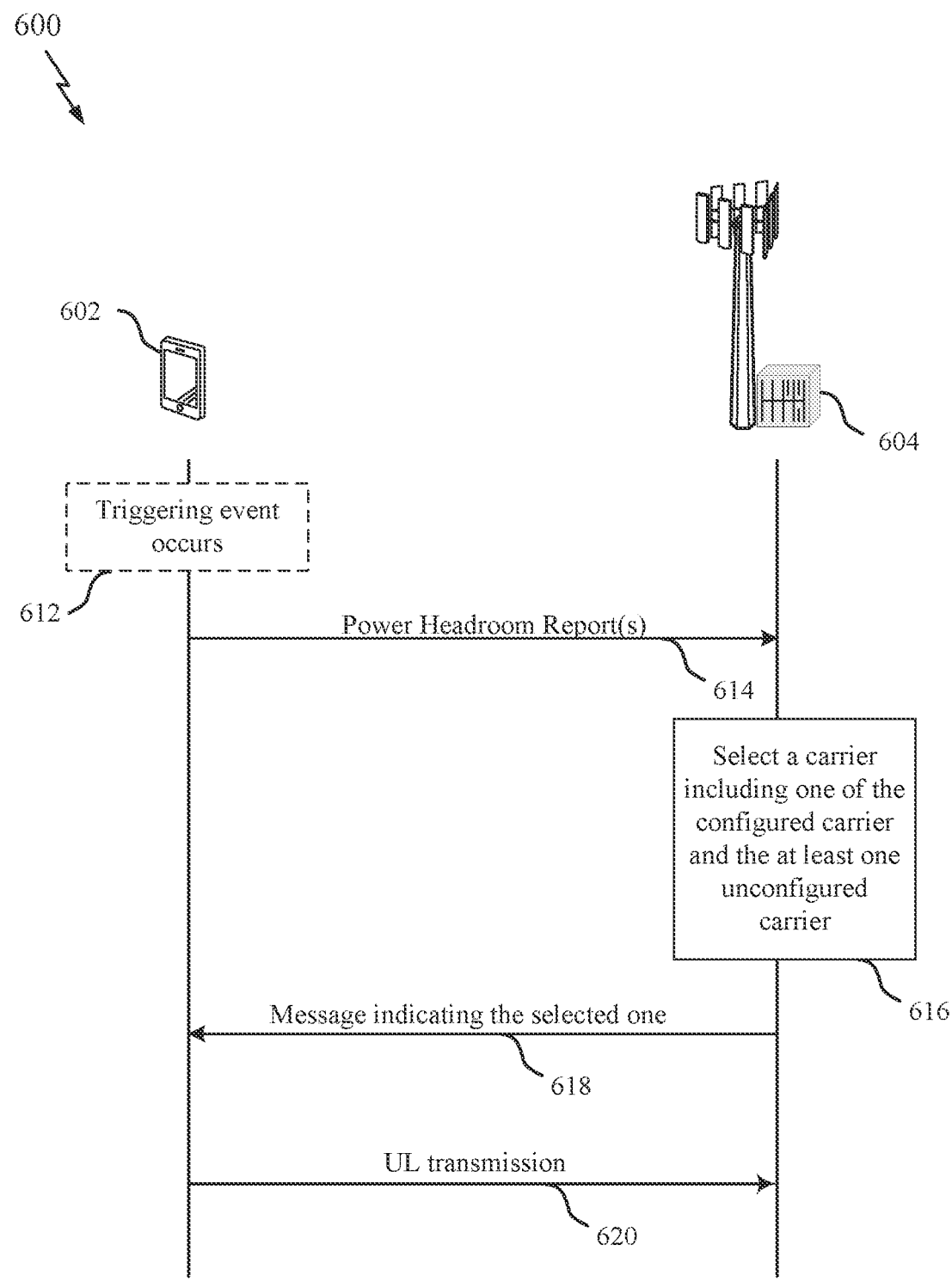
FIG. 6 is an example flow diagram illustrating features performed by a UE and a network entity, according to some aspects

FIG. 6 is an example flow diagram illustrating features performed by a UE and a network entity, according to some aspects. As shown in FIG. 6, a UE 602 and a network entity 604 may communicate with each other to perform features of various aspects. In some aspects, the UE 602 may be the UE 106 of FIG. 1 and the network entity 604 may be the network entity 108 of FIG. 1. In some aspects, the UE 602 may be the UE 502 of FIG. 5 and the network entity 604 may be the network entity 504 of FIG. 5.

At 614, the UE 602 may transmit, and the network entity 604 may receive, a PHR including first power headroom information for a configured carrier configured for uplink communication and second power headroom information for at least one unconfigured carrier that is unconfigured for uplink communication. In some aspects, the UE 602 at 614 may transmit the PHR when the UE 602 determines at 612 that a trigger event for the PHR has occurred or that a PHR request is received from the network entity 604. In some aspects, the UE 602 at 614 may transmit the PHR periodically based on a periodicity.

At 616, the network entity 604 may select a carrier including one of the configured carrier and the at least one unconfigured carrier based on the PHR.

At 618, the network entity 604 may transmit, and the UE 602 may receive, a message indicating the selected carrier.

At 620, the UE 602 may transmit to the network entity 604 an uplink transmission, such as a PUSCH transmission, via the selected carrier.

Figure 7:
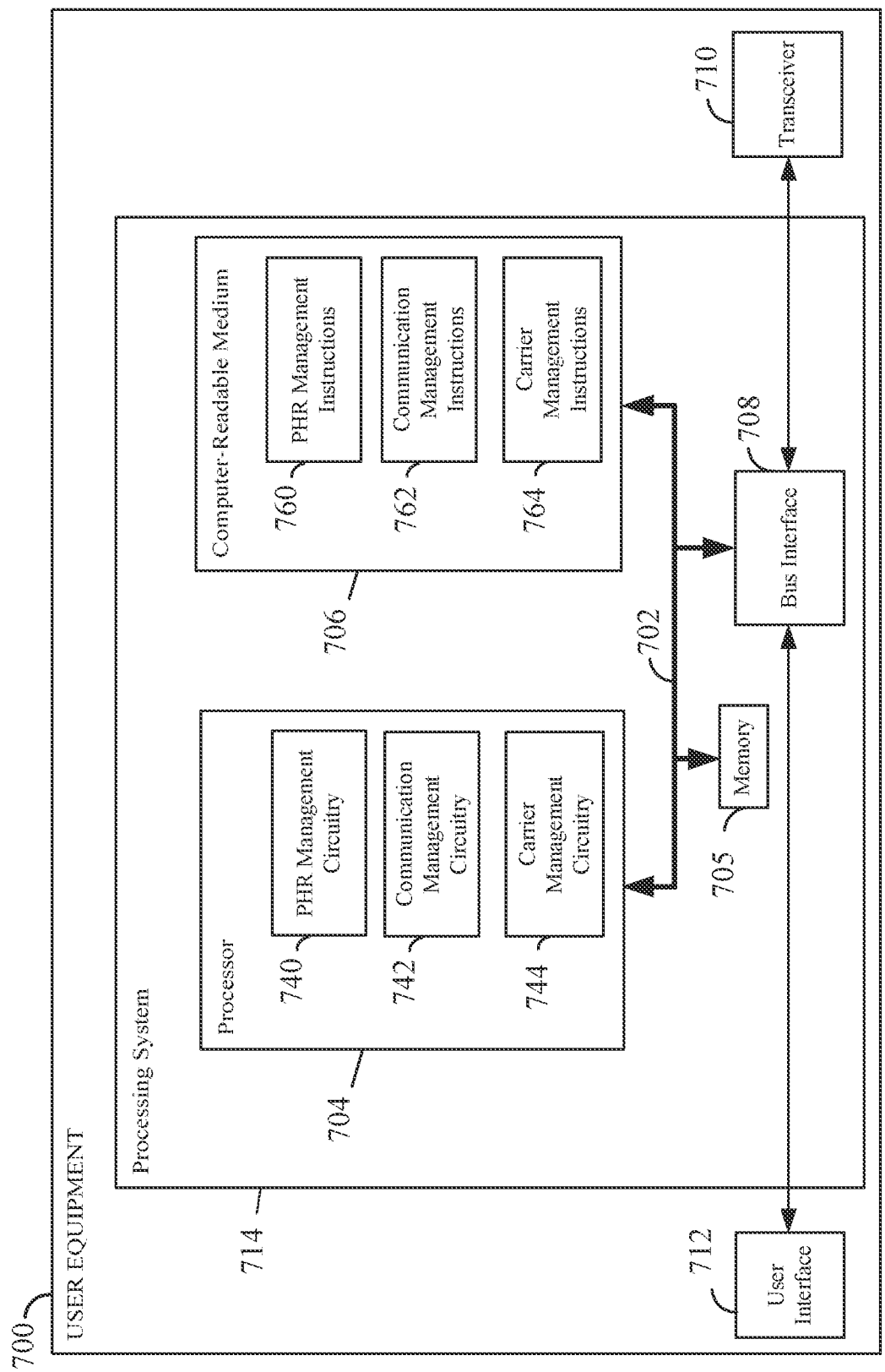
FIG. 7 is a block diagram conceptually illustrating an example of a hardware implementation for a UE according to some aspects.

FIG. 7 is a block diagram illustrating an example of a hardware implementation for a scheduled entity 700 employing a processing system 714. For example, the scheduled entity 700 may be a UE as illustrated in any one or more of FIGS. 1, 2, 3, 5, and/or 6. In another example, the scheduled entity 700 may be a base station as illustrated in any one or more of FIGS. 1, 2, and/or 3.

The scheduled entity 700 may be implemented with a processing system 714 that includes one or more processors 704. Examples of processors 704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduled entity 700 may be configured to perform any one or more of the functions described herein. That is, the processor 704, as utilized in a scheduled entity 700, may be used to implement any one or more of the processes and procedures described below and illustrated in FIG. 8.

In this example, the processing system 714 may be implemented with a bus architecture, represented generally by the bus 702. The bus 702 may include any number of interconnecting buses and bridges depending on the specific application of the processing system 714 and the overall design constraints. The bus 702 communicatively couples together various circuits including one or more processors (represented generally by the processor 704), a memory 705, and computer-readable media (represented generally by the computer-readable storage medium 706). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a communication interface or means for communicating with various other apparatus over a transmission medium. Depending upon the nature of the apparatus, a user interface 712 (e.g., keypad, display, speaker, microphone, joystick) may also be provided. Of course, such a user interface 712 is optional, and may be omitted in some examples, such as a base station.

In some aspects of the disclosure, the processor 704 may include PHR management circuitry 740 configured for various functions, including, for example, transmitting, to a network entity, a PHR including first power headroom information for a configured carrier configured for uplink communication and second power headroom information for at least one unconfigured carrier that is unconfigured for uplink communication. For example, the PHR management circuitry 740 may be configured to implement one or more of the functions described below in relation to FIG. 8, including, e.g., block 802.

In some aspects of the disclosure, the processor 704 may include communication management circuitry 742 configured for various functions, including, for example, receiving, from the network entity, a message indicating a selected carrier comprising one of the configured carrier and the at least one unconfigured carrier in response to the PHR. For example, the communication management circuitry 742 may be configured to implement one or more of the functions described below in relation to FIG. 8, including, e.g., block 804.

In some aspects of the disclosure, the processor 704 may include carrier management circuitry 744 configured with the communication management circuitry 742 for various functions, including, for example, transmitting, to the network entity, an uplink transmission via the selected carrier. For example, the carrier management circuitry 744 with the communication management circuitry 742 may be configured to implement one or more of the functions described below in relation to FIG. 8, including, e.g., block 806.

The processor 704 is responsible for managing the bus 702 and general processing, including the execution of software stored on the computer-readable storage medium 706. The software, when executed by the processor 704, causes the processing system 714 to perform the various functions described below for any particular apparatus. The computer-readable storage medium 706 and the memory 705 may also be used for storing data that is manipulated by the processor 704 when executing software.

One or more processors 704 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 706. The computer-readable storage medium 706 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 706 may reside in the processing system 714, external to the processing system 714, or distributed across multiple entities including the processing system 714. The computer-readable storage medium 706 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

In some aspects of the disclosure, the computer-readable storage medium 706 may include PHR management software/instructions 760 configured for various functions, including, for example, transmitting, to a network entity, a PHR including first power headroom information for a configured carrier configured for uplink communication and second power headroom information for at least one unconfigured carrier that is unconfigured for uplink communication. For example, the PHR management software/instructions 760 may be configured to implement one or more of the functions described below in relation to FIG. 8, including, e.g., block 802.

In some aspects of the disclosure, the computer-readable storage medium 706 may include communication management software/instructions 762 configured for various functions, including, for example, receiving, from the network entity, a message indicating a selected carrier comprising one of the configured carrier and the at least one unconfigured carrier in response to the PHR. For example, the communication management software/instructions 762 may be configured to implement one or more of the functions described below in relation to FIG. 8, including, e.g., block 804.

In some aspects of the disclosure, the computer-readable storage medium 706 may include carrier management software/instructions 764 configured with the communication management software/instructions 762 for various functions, including, for example, transmitting, to the network entity, an uplink transmission via the selected carrier. For example, the carrier management software/instructions 764 with the communication management software/instructions 762 may be configured to implement one or more of the functions described below in relation to FIG. 8, including, e.g., block 806.

Figure 8:
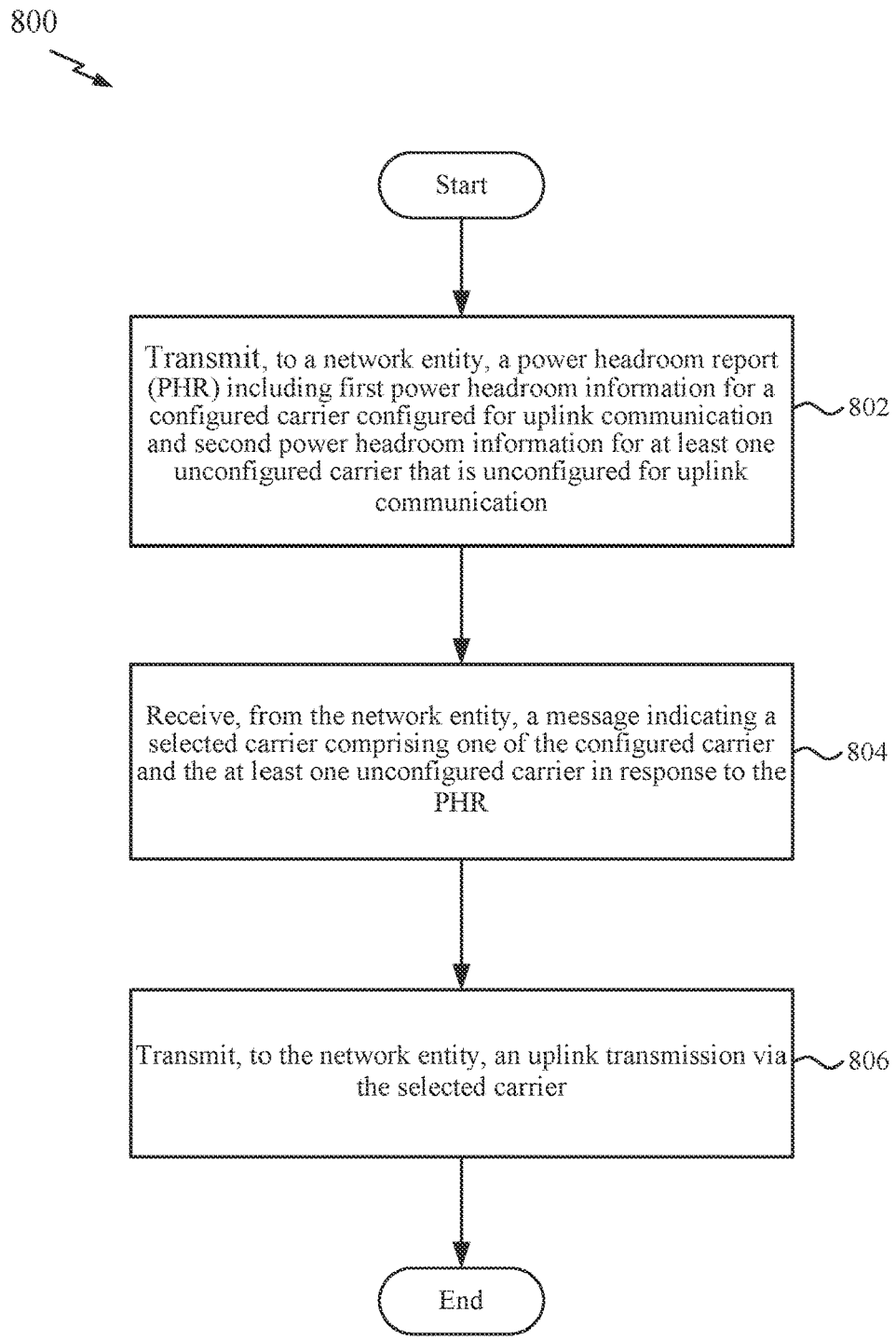
FIG. 8 is a flow chart illustrating an exemplary process for wireless communication by a UE in accordance with some aspects.

FIG. 8 is a flow chart illustrating an exemplary process 800 for wireless communication by a UE in accordance with some aspects. As described below, some or all illustrated features may be omitted in a particular implementation within the scope of the present disclosure, and some illustrated features may not be required for implementation of all embodiments. In some examples, the process 800 may be carried out by the scheduled entity 700 illustrated in FIG. 7. In some examples, the process 800 may be carried out by any suitable apparatus or means for carrying out the functions or algorithm described below.

At block 802, the UE may transmit, to a network entity, a PHR including first power headroom information for a configured carrier configured for uplink communication and second power headroom information for at least one unconfigured carrier that is unconfigured for uplink communication. For example, the PHR management circuitry 740 shown and described above in connection with FIG. 7 may provide means for transmitting the PHR. In an aspect, the PHR may be transmitted via a multiple entry PHR MAC-CE.

In an aspect, the PHR may be transmitted: periodically based on a periodicity, upon receiving a PHR request from the network entity, or in response to a triggering event.

In an aspect, the periodicity may be based on a periodicity of a carrier different from the configured carrier. In an aspect, the PHR request may be received in response to at least one of: a signal strength at the network entity being below a network entity signal strength threshold, or a load parameter on the configured carrier exceeding a carrier load threshold. In an aspect, the triggering event may include at least one of: a pathloss of the configured carrier exceeding a pathloss threshold, a signal strength of the configured carrier falling below a UE signal strength threshold, an available power in one of the at least one unconfigured carrier exceeding an available power threshold, an available power in one of the at least one unconfigured carrier exceeding an available power in the configured carrier by at least a relative available power threshold, or a P-MPR backoff for one of the at least one unconfigured carrier being lower than a backoff threshold.

In an aspect, the first power headroom information is based on PUSCH transmission on the configured carrier, and the second power headroom information is based on a reference PUSCH transmission on each of the at least one unconfigured carrier.

In an aspect, the first power headroom information includes one or more of a first maximum UE output power, a first power management maximum power reduction value, and a first power headroom value for the configured carrier, and the second power headroom information includes one or more of a second maximum UE output power, a second power management maximum power reduction value, and a second power headroom value for each of the at least one unconfigured carrier, respectively. In an aspect, the second power headroom value is based on the second maximum UE output power, the second power management maximum power reduction value, an open-loop transmit power based on an open-loop power control, and a pathloss. In an aspect, the open-loop transmit power is based on an open-loop nominal power parameter that is set to a predefined default value and an open-loop UE power parameter that is set to zero for the at least one unconfigured carrier.

At block 804, the UE may receive, from the network entity, a message indicating a selected carrier comprising one of the configured carrier and the at least one unconfigured carrier in response to the PHR. For example, the communication management circuitry 742 shown and described above in connection with FIG. 7 may provide means for receiving the message. In an aspect, the UE receiving the message at block 804 may include receiving an RRC configuration message indicating the selected carrier.

At block 806, the UE may transmit, to the network entity, an uplink transmission via the selected carrier. For example, the carrier management circuitry 744 with the communication management circuitry 742 shown and described above in connection with FIG. 7 may provide means for transmitting the uplink transmission.

In one configuration, the UE/scheduled entity 700 for wireless communication includes means for transmitting, to a network entity, a PHR including first power headroom information for a configured carrier configured for uplink communication and second power headroom information for at least one unconfigured carrier that is unconfigured for uplink communication, means for receiving, from the network entity, a message indicating a selected carrier comprising one of the configured carrier and the at least one unconfigured carrier in response to the PHR, and means for transmitting, to the network entity, an uplink transmission via the selected carrier. In one aspect, the aforementioned means may be the processor(s) 704 shown in FIG. 7 configured to perform the functions recited by the aforementioned means. In another aspect, the aforementioned means may be a circuit or any apparatus configured to perform the functions recited by the aforementioned means.

Of course, in the above examples, the circuitry included in the processor 704 is merely provided as an example, and other means for carrying out the described functions may be included within various aspects of the present disclosure, including but not limited to the instructions stored in the computer-readable storage medium 706, or any other suitable apparatus or means described in any one of the FIGS. 1, 2, 3, 5, and/or 6, and utilizing, for example, the processes and/or algorithms described herein in relation to FIG. 8.

Figure 9:
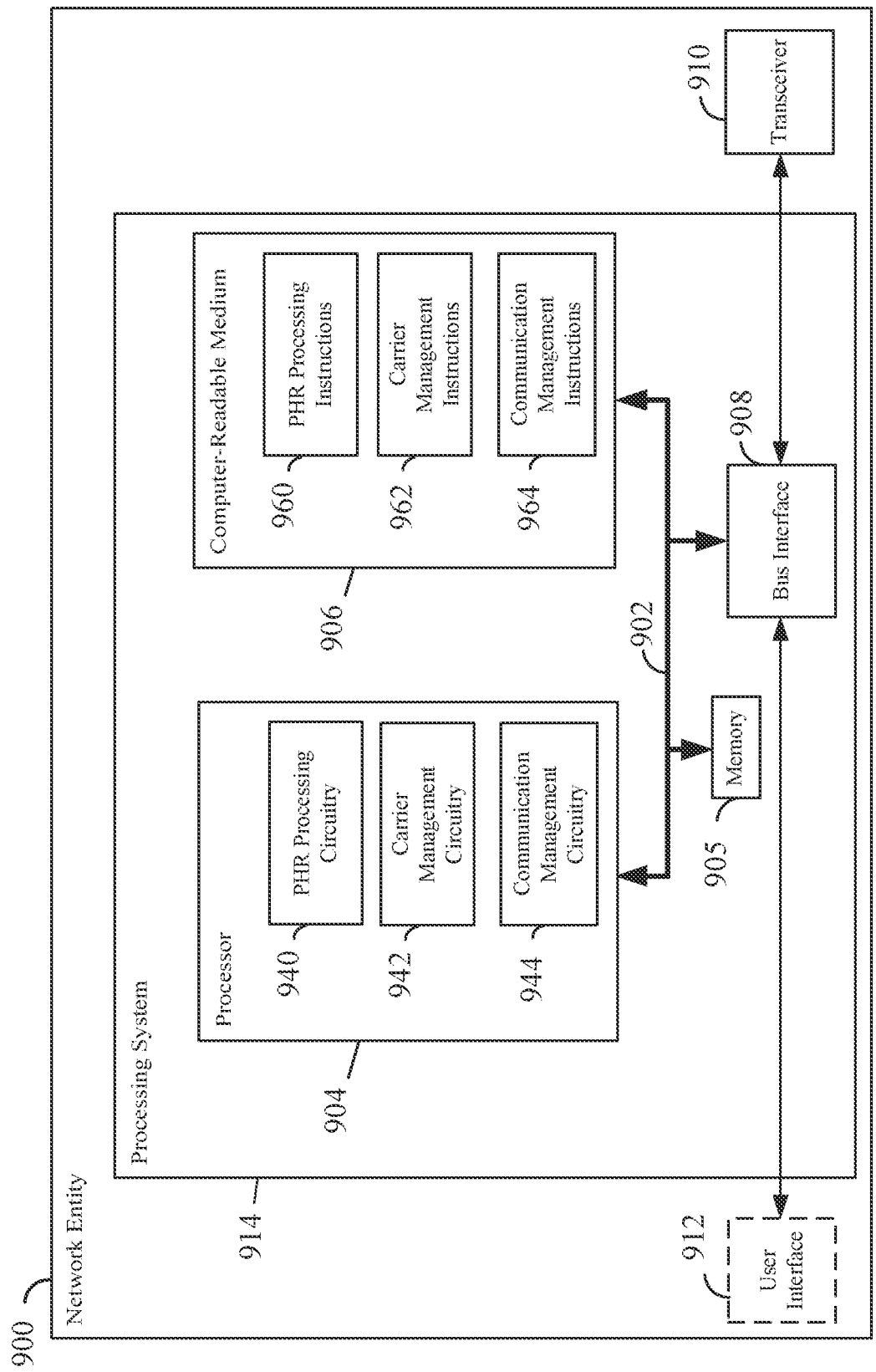
FIG. 9 is a block diagram conceptually illustrating an example of a hardware implementation for a network entity according to some aspects.

FIG. 9 is a conceptual diagram illustrating an example of a hardware implementation for an exemplary network entity employing a processing system 914. In accordance with various aspects of the disclosure, an element, or any portion of an element, or any combination of elements may be implemented with a processing system 914 that includes one or more processors 904. For example, the network entity may be a network entity or a base station as illustrated in any one or more of FIGS. 1, 2, 3, 5, and/or 6.

The processing system 914 may be substantially the same as the processing system 714 illustrated in FIG. 7, including a bus interface 908, a bus 902, memory 905, a processor 904, and a computer-readable storage medium 906. Depending upon the nature of the apparatus, a user interface 912 (e.g., keypad, display, speaker, microphone, joystick) may also be provided. Furthermore, the network entity may include a transceiver 910 substantially similar to those described above in FIG. 7. That is, the processor 904, as utilized in a network entity, may be used to implement any one or more of the processes described below and illustrated in FIG. 10.

In some aspects of the disclosure, the processor 904 may include PHR processing circuitry 940 configured for various functions, including, for example, receiving, from a UE, a PHR including first power headroom information for a configured carrier configured for uplink communication and second power headroom information for at least one unconfigured carrier that is unconfigured for uplink communication. For example, the PHR processing circuitry 940 may be configured to implement one or more of the functions described below in relation to FIG. 10, including, e.g., block 1002.

In some aspects of the disclosure, the processor 904 may include carrier management circuitry 942 configured for various functions, including, for example, selecting a carrier comprising one of the configured carrier and the at least one unconfigured carrier based on the PHR. For example, the carrier management circuitry 942 may be configured to implement one or more of the functions described below in relation to FIG. 10, including, e.g., block 1004.

In some aspects of the disclosure, the processor 904 may include communication management circuitry 944 configured for various functions, including, for example, transmitting, to the UE, a message indicating the selected carrier. For example, the communication management circuitry 944 may be configured to implement one or more of the functions described below in relation to FIG. 10, including, e.g., block 1006.

In some aspects of the disclosure, the communication management circuitry 944 may be configured for various functions, including, for example, receiving, from the UE, an uplink transmission via the selected carrier. For example, the communication management circuitry 944 may be configured to implement one or more of the functions described below in relation to FIG. 10, including, e.g., block 1008.

In some aspects of the disclosure, the computer-readable storage medium 906 may include PHR processing software/instructions 960 configured for various functions, including, for example, receiving, from a UE, a PHR including first power headroom information for a configured carrier configured for uplink communication and second power headroom information for at least one unconfigured carrier that is unconfigured for uplink communication. For example, the PHR processing software/instructions 960 may be configured to implement one or more of the functions described below in relation to FIG. 10, including, e.g., block 1002.

In some aspects of the disclosure, the computer-readable storage medium 906 may include carrier management software/instructions 962 configured for various functions, including, for example, selecting a carrier comprising one of the configured carrier and the at least one unconfigured carrier based on the PHR. For example, the carrier management software/instructions 962 may be configured to implement one or more of the functions described below in relation to FIG. 10, including, e.g., block 1004.

In some aspects of the disclosure, the computer-readable storage medium 906 may include communication management software/instructions 964 configured for various functions, including, for example, transmitting, to the UE, a message indicating the selected carrier. For example, the communication management software/instructions 964 may be configured to implement one or more of the functions described below in relation to FIG. 10, including, e.g., block 1006.

In some aspects of the disclosure, the communication management software/instructions 964 may be configured for various functions, including, for example, receiving, from the UE, an uplink transmission via the selected carrier. For example, the communication management software/instructions 964 may be configured to implement one or more of the functions described below in relation to FIG. 10, including, e.g., block 1008.

Figure 10:
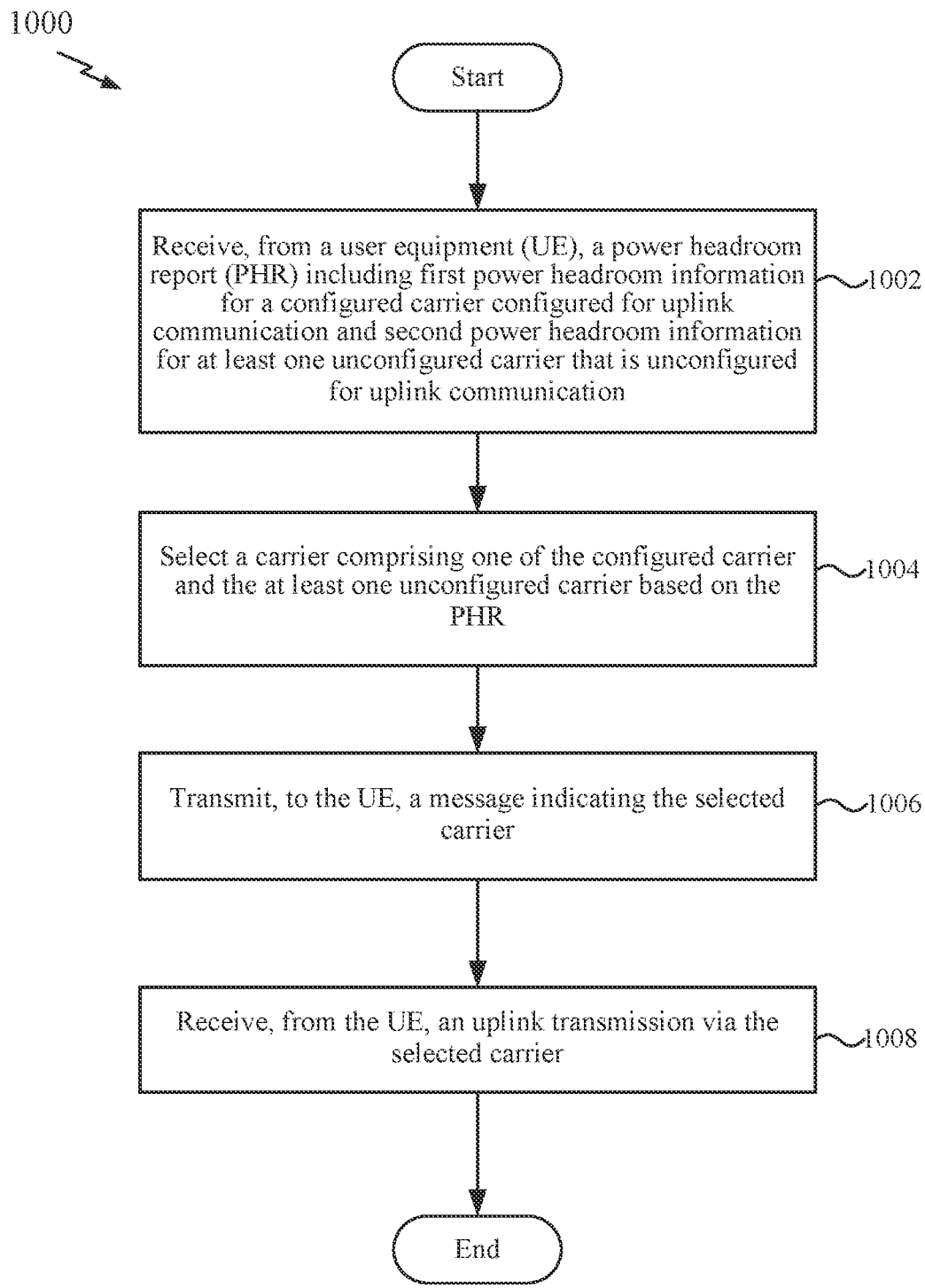
FIG. 10 is a flow chart illustrating an exemplary process for wireless communication by a network entity according to some aspects.

FIG. 10 is a flow chart illustrating an exemplary process 1000 for wireless communication by a network entity in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the network entity 900 illustrated in FIG. 9. In some examples, the process 1000 may be carried out by any suitable apparatus or means for carrying out the functions or algorithm described below.

At block 1002, the network entity may receive, from a UE, a PHR including first power headroom information for a configured carrier configured for uplink communication and second power headroom information for at least one unconfigured carrier that is unconfigured for uplink communication. For example, the PHR processing circuitry 940 shown and described above in connection with FIG. 9 may provide means for receiving the PHR. In an aspect, the PHR may be received via a multiple entry PHR MAC-CE.

In an aspect, the PHR may be received: periodically based on a periodicity, in response to transmitting a PHR request to the UE, or in response to a triggering event.

In an aspect, the periodicity may be based on a periodicity of a carrier different from the configured carrier. In an aspect, the triggering event may include at least one of: a pathloss of the configured carrier exceeding a pathloss threshold, a signal strength of the configured carrier falling below a signal strength threshold, an available power in one of the at least one unconfigured carrier exceeding an absolute available power threshold, an available power in one of the at least one unconfigured carrier exceeding an available power in the configured carrier by at least a relative available power threshold, or a P-MPR backoff for one of the at least one unconfigured carrier being lower than a backoff threshold.

In an aspect, the PHR request may be transmitted in response to at least one of: a signal strength at the network entity being below a network entity signal strength threshold, or a load parameter on the configured carrier exceeding a carrier load threshold.

In an aspect, the first power headroom information includes one or more of a first maximum UE output power, a first power management maximum power reduction value, and a first power headroom value for the configured carrier, and the second power headroom information includes one or more of a second maximum UE output power, a second power management maximum power reduction value, and a second power headroom value for each of the at least one unconfigured carrier, respectively. In an aspect, the second power headroom value is based on the second maximum UE output power, the second power management maximum power reduction value, an open-loop transmit power based on an open-loop power control, and a pathloss. In an aspect, the open-loop transmit power is based on an open-loop nominal power parameter that is set to a predefined default value and an open-loop UE power parameter that is set to zero for the at least one unconfigured carrier.

At block 1004, the network entity may select a carrier comprising one of the configured carrier and the at least one unconfigured carrier based on the PHR. For example, the carrier management circuitry 942 shown and described above in connection with FIG. 9 may provide means for selecting the carrier.

At block 1006, the network entity may transmit, to the UE, a message indicating the selected carrier. For example, the communication management circuitry 944 shown and described above in connection with FIG. 9 may provide means for transmitting the message. In an aspect, the network entity transmitting the message at block 1006 may include transmitting an RRC configuration message indicating the selected carrier.

At block 1008, the network entity may receive, from the UE, an uplink transmission via the selected carrier. For example, the communication management circuitry 944 shown and described above in connection with FIG. 9 may provide means for receiving the uplink transmission.

In one configuration, the network entity 900 for wireless communication includes means for receiving, from a UE, a PHR including first power headroom information for a configured carrier configured for uplink communication and second power headroom information for at least one unconfigured carrier that is unconfigured for uplink communication, means for selecting a carrier comprising one of the configured carrier and the at least one unconfigured carrier based on the PHR, means for transmitting, to the UE, a message indicating the selected carrier, and means for receiving, from the UE, an uplink transmission via the selected carrier. In one aspect, the aforementioned means may be the processor(s) 904 shown in FIG. 9 configured to perform the functions recited by the aforementioned means. In another aspect, the aforementioned means may be a circuit or any apparatus configured to perform the functions recited by the aforementioned means.

Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the FIGS. 1, 2, 3, 5, and/or 6, and utilizing, for example, the processes and/or algorithms described herein in relation to FIG. 10.

The following provides an overview of several aspects of the present disclosure.

Aspect 1: A method of wireless communication by a user equipment (UE), comprising: transmitting, to a network entity, a power headroom report (PHR) including first power headroom information for a configured carrier configured for uplink communication and second power headroom information for at least one unconfigured carrier that is unconfigured for uplink communication; receiving, from the network entity, a message indicating a selected carrier comprising one of the configured carrier and the at least one unconfigured carrier in response to the PHR; and transmitting, to the network entity, an uplink transmission via the selected carrier.

Aspect 2: The method of claim 1, wherein the receiving the message comprises receiving a radio resource control (RRC) configuration message indicating the selected carrier.

Aspect 3: The method of claim 1, wherein the PHR is transmitted: periodically based on a periodicity, upon receiving a PHR request from the network entity, or in response to a triggering event.

Aspect 4: The method of claim 3, wherein the triggering event includes at least one of: a pathloss of the configured carrier exceeding a pathloss threshold, a signal strength of the configured carrier falling below a UE signal strength threshold, an available power in one of the at least one unconfigured carrier exceeding an available power threshold, an available power in one of the at least one unconfigured carrier exceeding an available power in the configured carrier by at least a relative available power threshold, or a power management maximum power reduction (P-MPR) backoff for one of the at least one unconfigured carrier being lower than a backoff threshold.

Aspect 5: The method of claim 3, wherein the periodicity is based on a periodicity of a carrier different from the configured carrier.

Aspect 6: The method of claim 3, wherein the PHR request is received in response to at least one of: a signal strength at the network entity being below a network entity signal strength threshold, or a load parameter on the configured carrier exceeding a carrier load threshold.

Aspect 7: The method of claim 1, wherein the first power headroom information is based on physical uplink shared channel (PUSCH) transmission on the configured carrier, and wherein the second power headroom information is based on a reference PUSCH transmission on each of the at least one unconfigured carrier.

Aspect 8: The method of claim 1, wherein the first power headroom information includes one or more of a first maximum UE output power, a first power management maximum power reduction value, and a first power headroom value for the configured carrier, and wherein the second power headroom information includes one or more of a second maximum UE output power, a second power management maximum power reduction value, and a second power headroom value for each of the at least one unconfigured carrier, respectively.

Aspect 9: The method of claim 8, wherein the second power headroom value is based on the second maximum UE output power, the second power management maximum power reduction value, an open-loop transmit power based on an open-loop power control, and a pathloss.

Aspect 10: The method of claim 9, wherein the open-loop transmit power is based on an open-loop nominal power parameter that is set to a predefined default value and an open-loop UE power parameter that is set to zero for the at least one unconfigured carrier.

Aspect 11: The method of claim 1, wherein the PHR is transmitted via a multiple entry PHR media access control (MAC) control element (CE).

Aspect 12: A user equipment (UE) comprising: a transceiver configured to communicate with a radio access network, a memory, and a processor communicatively coupled to the transceiver and the memory, wherein the processor and the memory are configured to perform any one of aspects 1 through 11.

Aspect 13: A UE configured for wireless communication comprising at least one means for performing any one of aspects 1 through 11.

Aspect 14: A non-transitory computer-readable storage medium having instructions for a UE thereon, wherein the instructions, when executed by a processing circuit, cause the processing circuit to perform any one of aspects 1 through 11.

Aspect 15: A method of wireless communication by a network entity, comprising: receiving, from a user equipment (UE), a power headroom report (PHR) including first power headroom information for a configured carrier configured for uplink communication and second power headroom information for at least one unconfigured carrier that is unconfigured for uplink communication; selecting a carrier comprising one of the configured carrier and the at least one unconfigured carrier based on the PHR; transmitting, to the UE, a message indicating the selected carrier; and receiving, from the UE, an uplink transmission via the selected carrier.

Aspect 16: The method of claim 15, wherein the transmitting the message comprises transmitting a radio resource control (RRC) configuration message indicating the selected carrier.

Aspect 17: The method of claim 15, wherein the PHR is received: periodically based on a periodicity, in response to transmitting a PHR request to the UE, or in response to a triggering event.

Aspect 18: The method of claim 17, wherein the triggering event includes at least one of: a pathloss of the configured carrier exceeding a pathloss threshold, a signal strength of the configured carrier falling below a signal strength threshold, an available power in one of the at least one unconfigured carrier exceeding an absolute available power threshold, an available power in one of the at least one unconfigured carrier exceeding an available power in the configured carrier by at least a relative available power threshold, or a power management maximum power reduction (P-MPR) backoff for one of the at least one unconfigured carrier being lower than a backoff threshold.

Aspect 19: The method of claim 17, wherein the periodicity is based on a periodicity of a carrier different from the configured carrier.

Aspect 20: The method of claim 17, wherein the PHR request is transmitted in response to at least one of: a signal strength at the network entity being below a network entity signal strength threshold, or a load parameter on the configured carrier exceeding a carrier load threshold.

Aspect 21: The method of claim 15, wherein the first power headroom information is based on physical uplink shared channel (PUSCH) transmission on the configured carrier, and wherein the second power headroom information is based on a reference PUSCH transmission on each of the at least one unconfigured carrier.

Aspect 22: The method of claim 15, wherein the first power headroom information includes one or more of a first maximum UE output power, a first power management maximum power reduction value, and a first power headroom value for the configured carrier, and wherein the second power headroom information includes one or more of a second maximum UE output power, a second power management maximum power reduction value, and a second power headroom value for each of the at least one unconfigured carrier, respectively.

Aspect 23: The method of claim 22, wherein the second power headroom value is based on the second maximum UE output power, the second power management maximum power reduction value, an open-loop transmit power based on an open-loop power control, and a pathloss.

Aspect 24: The method of claim 23, wherein the open-loop transmit power is based on an open-loop nominal power parameter that is set to a predefined default value and an open-loop UE power parameter that is set to zero for the at least one unconfigured carrier.

Aspect 25: The method of claim 15, wherein the PHR is received via a multiple entry PHR media access control (MAC) control element (CE).

Aspect 26: A network entity comprising: a transceiver configured to communicate with a radio access network, a memory, and a processor communicatively coupled to the transceiver and the memory, wherein the processor and the memory are configured to perform any one of aspects 15 through 25.

Aspect 27: A network entity configured for wireless communication comprising at least one means for performing any one of aspects 15 through 25.

Aspect 28: A non-transitory computer-readable storage medium entity having instructions for a network thereon, wherein the instructions, when executed by a processing circuit, cause the processing circuit to perform any one of aspects 15 through 25.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-10 may be configured to perform one or more of the methods, features, or steps described herein.

The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication by a user equipment (UE), comprising:
   transmitting, to a network entity, a power headroom report (PHR) including first power headroom information for a configured carrier configured for uplink communication and second power headroom information for at least one unconfigured carrier that is unconfigured for uplink communication;
   receiving, from the network entity, a message indicating a selected carrier comprising one of the configured carrier and the at least one unconfigured carrier in response to the PHR; and
   transmitting, to the network entity, an uplink transmission via the selected carrier.

2. The method of claim 1, wherein the receiving the message comprises receiving a radio resource control (RRC) configuration message indicating the selected carrier.

3. The method of claim 1, wherein the PHR is transmitted:
   periodically based on a periodicity,
   upon receiving a PHR request from the network entity, or
   in response to a triggering event.

4. The method of claim 3, wherein the triggering event includes at least one of:
   a pathloss of the configured carrier exceeding a pathloss threshold,
   a signal strength of the configured carrier falling below a UE signal strength threshold,
   an available power in one of the at least one unconfigured carrier exceeding an available power threshold,
   an available power in one of the at least one unconfigured carrier exceeding an available power in the configured carrier by at least a relative available power threshold, or
   a power management maximum power reduction (P-MPR) backoff for one of the at least one unconfigured carrier being lower than a backoff threshold.

5. The method of claim 3, wherein the periodicity is based on a periodicity of a carrier different from the configured carrier.

6. The method of claim 3, wherein the PHR request is received in response to at least one of:
   a signal strength at the network entity being below a network entity signal strength threshold, or
   a load parameter on the configured carrier exceeding a carrier load threshold.

7. The method of claim 1, wherein the first power headroom information is based on physical uplink shared channel (PUSCH) transmission on the configured carrier, and
   wherein the second power headroom information is based on a reference PUSCH transmission on each of the at least one unconfigured carrier.

8. The method of claim 1, wherein the first power headroom information includes one or more of a first maximum UE output power, a first power management maximum power reduction value, and a first power headroom value for the configured carrier, and
   wherein the second power headroom information includes one or more of a second maximum UE output power, a second power management maximum power reduction value, and a second power headroom value for each of the at least one unconfigured carrier, respectively.

9. The method of claim 8, wherein the second power headroom value is based on the second maximum UE output power, the second power management maximum power reduction value, an open-loop transmit power based on an open-loop power control, and a pathloss.

10. The method of claim 9, wherein the open-loop transmit power is based on an open-loop nominal power parameter that is set to a predefined default value and an open-loop UE power parameter that is set to zero for the at least one unconfigured carrier.

11. The method of claim 1, wherein the PHR is transmitted via a multiple entry PHR media access control (MAC) control element (CE).

12. A user equipment (UE) for wireless communication, comprising:
   at least one processor;
   a transceiver communicatively coupled to the at least one processor; and
   a memory communicatively coupled to the at least one processor,
   wherein the at least one processor is configured to:
      transmit, to a network entity, a power headroom report (PHR) including first power headroom information for a configured carrier configured for uplink communication and second power headroom information for at least one unconfigured carrier that is unconfigured for uplink communication;
      receive, from the network entity, a message indicating a selected carrier comprising one of the configured carrier and the at least one unconfigured carrier in response to the PHR; and transmit, to the network entity, an uplink transmission via the selected carrier.

13. The UE of claim 12, wherein the at least one processor configured to receive the message is configured to receive a radio resource control (RRC) configuration message indicating the selected carrier.

14. The UE of claim 12, wherein the PHR is transmitted:
periodically based on a periodicity,
upon receiving a PHR request from the network entity, or
in response to a triggering event.

15. The UE of claim 14, wherein the triggering event includes at least one of:
a pathloss of the configured carrier exceeding a pathloss threshold,
a signal strength of the configured carrier falling below a UE signal strength threshold,
an available power in one of the at least one unconfigured carrier exceeding an available power threshold,
an available power in one of the at least one unconfigured carrier exceeding an available power in the configured carrier by at least a relative available power threshold, or
a power management maximum power reduction (P-MPR) backoff for one of the at least one unconfigured carrier being lower than a backoff threshold.

16. A method of wireless communication by a network entity, comprising:
receiving, from a user equipment (UE), a power headroom report (PHR) including first power headroom information for a configured carrier configured for uplink communication and second power headroom information for at least one unconfigured carrier that is unconfigured for uplink communication;
selecting a carrier comprising one of the configured carrier and the at least one unconfigured carrier based on the PHR;
transmitting, to the UE, a message indicating the selected carrier; and
receiving, from the UE, an uplink transmission via the selected carrier.

17. The method of claim 16, wherein the transmitting the message comprises transmitting a radio resource control (RRC) configuration message indicating the selected carrier.

18. The method of claim 16, wherein the PHR is received:
periodically based on a periodicity,
in response to transmitting a PHR request to the UE, or
in response to a triggering event.

19. The method of claim 18, wherein the triggering event includes at least one of:
a pathloss of the configured carrier exceeding a pathloss threshold,
a signal strength of the configured carrier falling below a signal strength threshold,
an available power in one of the at least one unconfigured carrier exceeding an absolute available power threshold,
an available power in one of the at least one unconfigured carrier exceeding an available power in the configured carrier by at least a relative available power threshold, or
a power management maximum power reduction (P-MPR) backoff for one of the at least one unconfigured carrier being lower than a backoff threshold.

20. The method of claim 18, wherein the periodicity is based on a periodicity of a carrier different from the configured carrier.

21. The method of claim 18, wherein the PHR request is transmitted in response to at least one of:
a signal strength at the network entity being below a network entity signal strength threshold, or
a load parameter on the configured carrier exceeding a carrier load threshold.

22. The method of claim 16, wherein the first power headroom information is based on physical uplink shared channel (PUSCH) transmission on the configured carrier, and
wherein the second power headroom information is based on a reference PUSCH transmission on each of the at least one unconfigured carrier.

23. The method of claim 16, wherein the first power headroom information includes one or more of a first maximum UE output power, a first power management maximum power reduction value, and a first power headroom value for the configured carrier, and
wherein the second power headroom information includes one or more of a second maximum UE output power, a second power management maximum power reduction value, and a second power headroom value for each of the at least one unconfigured carrier, respectively.

24. The method of claim 23, wherein the second power headroom value is based on the second maximum UE output power, the second power management maximum power reduction value, an open-loop transmit power based on an open-loop power control, and a pathloss.

25. The method of claim 24, wherein the open-loop transmit power is based on an open-loop nominal power parameter that is set to a predefined default value and an open-loop UE power parameter that is set to zero for the at least one unconfigured carrier.

26. The method of claim 16, wherein the PHR is received via a multiple entry PHR media access control (MAC) control element (CE).

27. A network entity for wireless communication, comprising:
at least one processor;
a transceiver communicatively coupled to the at least one processor; and
a memory communicatively coupled to the at least one processor,
wherein the at least one processor is configured to:
receive, from a user equipment (UE), a power headroom report (PHR) including first power headroom information for a configured carrier configured for uplink communication and second power headroom information for at least one unconfigured carrier that is unconfigured for uplink communication;
select a carrier comprising one of the configured carrier and the at least one unconfigured carrier based on the PHR;
transmit, to the UE, a message indicating the selected carrier; and
receive, from the UE, an uplink transmission via the selected carrier.

28. The network entity of claim 27, wherein the at least one processor configured to transmit the message is configured to transmit a radio resource control (RRC) configuration message indicating the selected carrier.

29. The network entity of claim 27, wherein the PHR is received:
periodically based on a periodicity,
in response to transmitting a PHR request to the UE, or
in response to a triggering event.

30. The network entity of claim 29, wherein the triggering event includes at least one of:
- a pathloss of the configured carrier exceeding a pathloss threshold,
- a signal strength of the configured carrier falling below a signal strength threshold,
- an available power in one of the at least one unconfigured carrier exceeding an absolute available power threshold,
- an available power in one of the at least one unconfigured carrier exceeding an available power in the configured carrier by at least a relative available power threshold, or
- a power management maximum power reduction (P-MPR) backoff for one of the at least one unconfigured carrier being lower than a backoff threshold.

* * * * *